United States Patent [19]
Milner et al.

[11] Patent Number: 5,289,435
[45] Date of Patent: Feb. 22, 1994

[54] CAPACITIVE FORCE TRANSDUCER

[75] Inventors: Peter J. Milner, Warwickshire; Andrew R. Fry, Hertfordshire, both of England

[73] Assignee: Bloxwich Engineering Limited, England

[21] Appl. No.: 915,730

[22] Filed: Jul. 27, 1992

[30] Foreign Application Priority Data

Feb. 3, 1990 [GB] United Kingdom ............... 9002433

[51] Int. Cl.5 ................................. H04R 23/00
[52] U.S. Cl. ..................................... 367/181; 73/780; 280/186
[58] Field of Search .............. 367/181; 73/780; 280/186; 29/25.41, 25.42, 594; 381/174

[56] References Cited

U.S. PATENT DOCUMENTS

| | | | |
|---|---|---|---|
| 2,653,306 | 9/1953 | Piety | 367/181 |
| 2,677,272 | 5/1954 | Blancher | 73/780 |
| 3,033,031 | 5/1962 | Gruber | 73/140 |
| 3,577,883 | 5/1971 | Werner | 73/780 |
| 4,062,229 | 12/1977 | Godfrey et al. | 73/780 |
| 4,197,753 | 4/1980 | Harting et al. | 73/780 |
| 4,386,533 | 6/1983 | Jackson et al. | 73/780 |

FOREIGN PATENT DOCUMENTS

| | | |
|---|---|---|
| 0057100 | 8/1982 | European Pat. Off. |
| 0373334 | 6/1990 | European Pat. Off. |
| 0815577 | 3/1981 | U.S.S.R. |
| 1201755 | 8/1970 | United Kingdom |

Primary Examiner—J. Woodrow Eldred
Attorney, Agent, or Firm—Baker, Maxham, Jester & Meador

[57] ABSTRACT

A capacitive electro-mechanical transducer for responding to both push and pull, for example in a road vehicle drawbar, involves axially spaced flanges (3) on the one force-transmitting member lying on opposite sides of a transverse portion (1) of the other member. The force is transmitted resiliently between the flanges and the portion, and there are capacitor plates (11) between the flanges (3) and the portion (1), so that on relative displacement the capacitance of one set of plates increases and that of the other set decreases. The plates are symmetrically disposed, e.g. of annular form, and they, or the dielectric (13) between them, can be wavy.

21 Claims, 2 Drawing Sheets

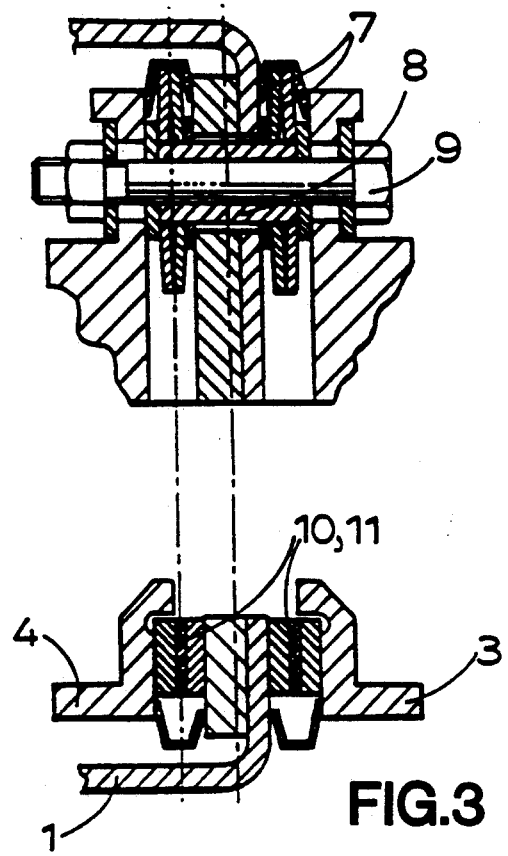
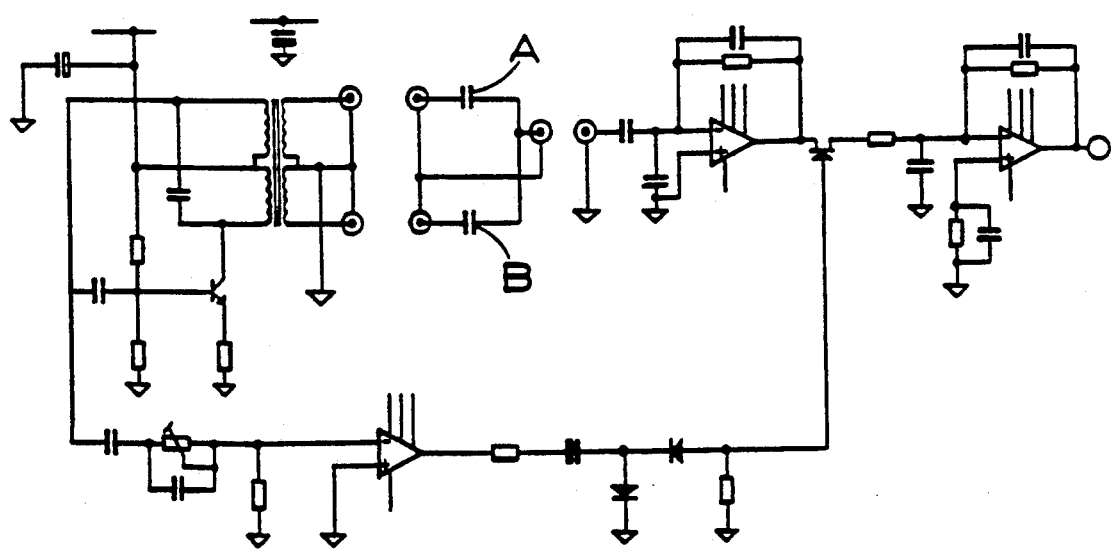

CAPACITIVE FORCE TRANSDUCER

This invention relates to a transducer designed to produce an electrical output signal dependent on a mechanically applied force. Such transducers find wide use in control systems of various kinds and the most commonly employed transducers rely either on variable inductance (a core or armature moving axially through a pair of aligned coils connected in a balanced circuit) or variable resistance e.g. strain gauges. Variable capacitance transducers are also known but are less widely used as it generally assumed that the severely non-linear characteristic (the relationship between displacement and capacitance is hyperbolic) makes them impractical and furthemore, unless very large- area electrodes or multi-plate arrangements are used, the absolute value of the capacitance involved is very small and the changes with displacement can be swamped by stray capacitance from leads and other components.

However, as will be shown below, variable capacitance has its place in the field of transducers, and advantage can be taken of its characteristics which include simplicity and the ability to withstand an adverse-environment.

A particular need for a rugged electro-mechanical transducer arises in the automatic control of the braking of trailer vehicles. It has been appreciated that in a vehicle assembly, especially a road vehicle assembly, comprising a tractor and trailer (or semi-trailer) with the brakes applied on both vehicles from a source on the tractor, it is desirable to match the relative braking effort in the two vehicles to one another under all load conditions, so that the two vehicles are braked equally, regardless of whether, for example, the trailer is empty or fully loaded. The only fully satisfactory way of doing this is by sensing the load in the drawbar or the fifth-wheel coupling between the two vehicles during braking and using the resulting information to modify the braking effort in the trailer in a sense such as to reduce that load towards zero, or at least to a certain low value or range of values.

Except in a somewhat crude system of this kind, it is therefore necessary to measure both tension and compression loads in the drawbar. This virtually puts resistance strain gauges out of the running, unless somewhat complicated prestressed arrangements are used or duality is employed at considerable expense.

The aim of the present invention, therefore is to put forward a novel variable capacitance transducer of simple and rugged construction suitable for use in hostile environments.

According to the invention we propose an arrangement in which one load-transmitting member having a central axis extends through a second load-transmitting member and there are flanges secured to the first member and lying on opposite sides of the second member, and the force, acting along the axis, is transmitted between the members by resilient means between both flanges and the second member at points symmetrically disposed around the axis, so that both tensile and compressive forces can be transmitted, and capacitor plates are mounted on, or associated with, both flanges and both faces of the second member and are distributed symmetrically around those flanges and that member, so that on relative axial displacement between the members under load the capacitance on one side increases while that on the other side decreases. It will be appreciated that the symmetrical disposition of the capacitor plates substantially nullifies the effect of non-axial forces on the assembly.

By appropriate setting, and by connecting the two capacitances-in an appropriate manner, for example in a bridge circuit or at least a half-bridge circuit, a substantially linear response can be obtained over a significant range of movement. By fitting resilient means of appropriate spring rate one can cover a wide range of loads with a given mechanical layout and without altering the capacitor arrangements in any way. Conveniently the resilient means can comprise disc springs.

Preferably, according to a further important feature of the invention, the capacitors are not individual capacitors spaced around the axis but are of annular form, the plates being in the form of rings encircling the first-mentioned force-transmitting member.

The invention will now be described by way of example with reference to the accompanying drawings in which:

FIG. 3 is a section through the assembly on the line A—A in FIG. 2; and

FIG. 4 shows one possible circuit for producing an electrical output.

Figure 1:
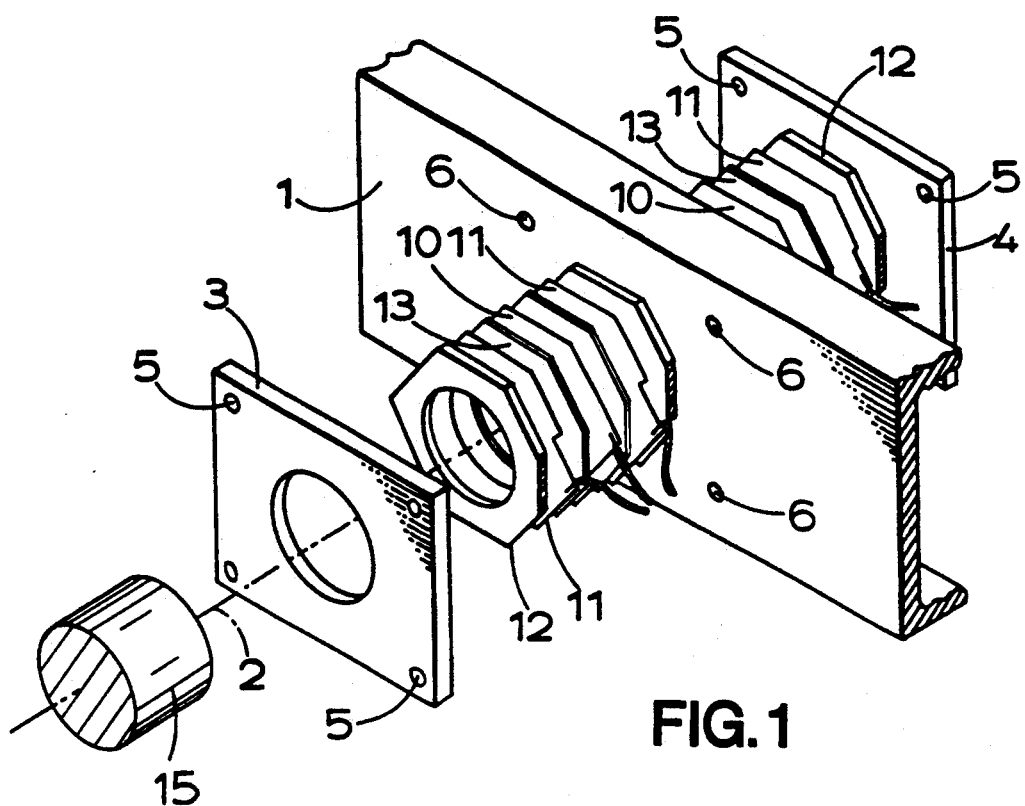
FIG. 1 is a diagrammatic exploded isometric view of a transducer assembly according to the invention, applied to a tractor-trailer drawbar.
Figure 2:
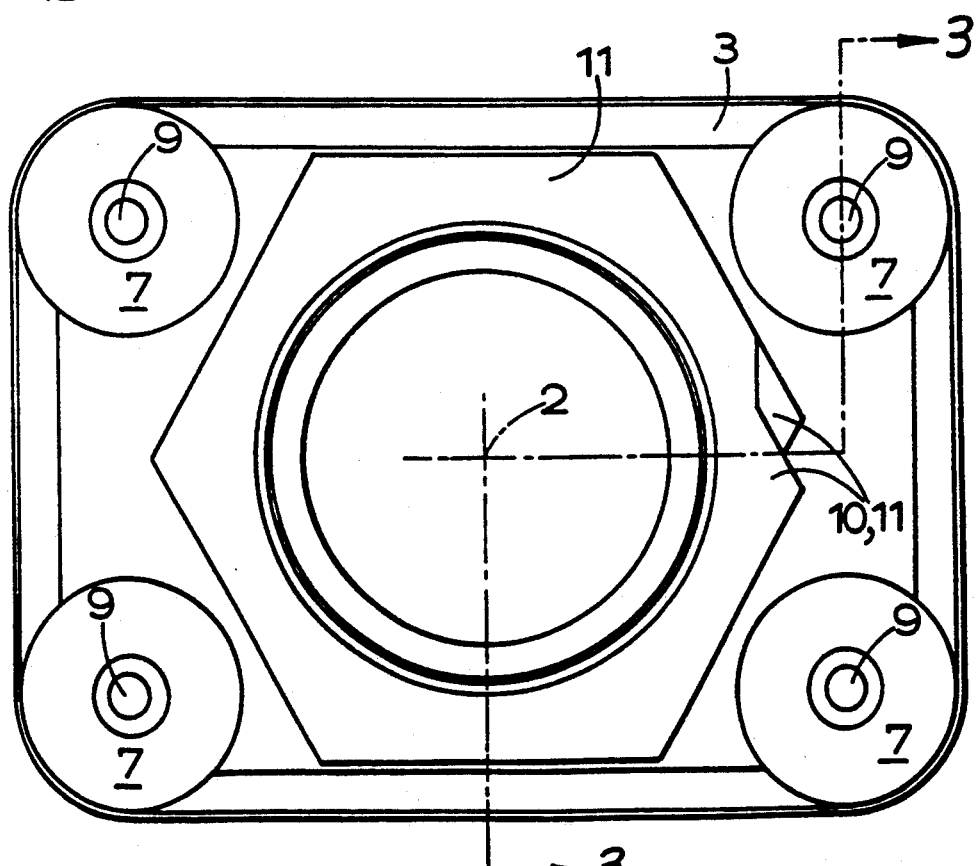
FIG. 2 is a transverse section looking at one of the flanges and its associated capacitor, looking along the axis.

Referring first to FIG. 1, the drawbeam, i.e. the transverse chassis member of a towing vehicle through which the towing load is taken, is shown at 1. The drawbar itself is omitted for clarity and so is the hitch assembly to which the drawbar is detachably secured, but the main pin of the hitch assembly 15 forming a first load transmitting member lies on the axis indicated at 2 and has secured to it two substantial flanges 3 and 4. Four symmetrically placed bolts passing through holes in the flanges and the drawbeam transmit the towing load, and in fact this is a standard layout, with an ISO standard applicable to the positions of the holes. In the standard arrangements the assembly would be tight, with no play between the flanges and the drawbeam except possibly some hard rubber packing to give a slight degree of resilience.

In the arrangement according to the invention, however, there are disc springs 7 (FIG. 3) between the flanges 3 and 4 and the drawbeam 1, and a rigid spacer 8 between the two flanges, so that bolts 9 hold the flanges a fixed distance apart, and when there is no load the drawbeam assembly is midway between them. The flanges as a whole move to the left or to the right (as viewed in FIG. 3) when a load is applied, to an extent which is substantially proportional to the load, and it is important to note that this load may be positive or negative, i.e. a push or a pull in the drawbar.

Independently of the bolts 9 and springs 7 there are capacitors formed by annular electrodes surrounding the main pin of the hitch. On each side of the drawbeam two electrodes 10 and 11 are insulated from the drawbeam and the adjacent flange by insulating rings 12 and are spaced apart from one another by a ring of dielectric 13, preferably nylon.

It will be understood that as the load in the drawbar increases in one direction or the other the capacitor electrodes 10 and 11 on one side will be squeezed closer together whilst those on the other side of the drawbeam will move apart. In the preferred arrangement we do not rely simply on the resilience of the dielectric but make the ring-shaped electrodes of wavy form, i.e. a circumferential wave or corrugation is pressed into each of them, so that they tend to spring apart. They are preferably made of stainless steel, which has the required resilience combined with durability, but another possibility is phosphor-bronze.

An alternative to putting a wave in each electrode would be to make the dielectric wavy. One way of doing this would be to apply evenly circumferentially spaced radial ribs, e.g. by adhesive, to opposite sides of the dielectric alternately, so that they are staggered, for example six each side. A further possibility is to use a dielectric of resilient material such as synthetic rubber, but considerable void space is necessary to accommodate the displaced rubber.

In a typical example the travel between zero and full load is of the order of 1 mm each way. Each capacitor has a mean value of about 470 pf. If desired, one could increase the capacitance by inserting further ring-shaped electrodes and dielectric rings between them, connecting them alternately in pairs.

Depending on the rate of the disc springs selected, a given assembly, with a given travel between zero and full load, can be designed for trailers of anything from, for example, 10 to 70 tons in weight. It will be appreciated that in the layout described the functions of transmitting the load and of generating the electrical signal are kept totally independent, i.e. the loads on the drawbar are not transmitted through the capacitor plates or through any, parts associated with them.

Dust seals or boots 14 extend around the gaps between the flanges and the drawbeam, but even if weather does penetrate the seals, the simple capacitor sensors are relatively insensitive to damage or failure, in contrast, for example, to delicate inductive transducers.

The handling of the signals is straightforward. FIG. 4 shows a layout in which the two capacitors, shown at A and B are connected in a half-bridge circuit and driven by anti-phase AC voltages of for example 1 volt peak-to-peak obtained from a centre-tapped secondary winding on the coil of a free-running oscillator which, in a typical case, operates at a frequency of 5 kHz.

The output signal from the sensor is AC coupled into the virtual earth of an amplifier; this eliminates the effect of capacitance of the connecting cables and other stray capacitances to earth. The output of the amplifier is then compared in a phase detector circuit with a reference signal from the oscillator to produce a bipolar output signal which, in a typical case, may range between + and − 5 volts.

The combination of the transducer, oscillator, amplifier and phase detector is capable of giving an approximately linear indication of both compressive and tensile forces in the drawbar.

We claim:

1. An electro-mechanical transducer assembly of the variable capacitance type comprising a first load-transmitting member having a central axis and extending through a second load-transmitting member, two axially spaced flanges on the first member lying on opposite sides of a transversely extending portion of the second member, resilient means for transmitting axial loads between each of the flanges and the said portion between them, whereby forces in both axial directions can be resiliently transmitted, the resilient means being symmetrically disposed around the axis, and electrical capacitor plates mounted on both flanges and both faces of the said portion of the second member, the plates being distributed symmetrically about those flanges and that portion, so that on relative axial displacement of the members under load in either direction the capacitance between the plates on one side of the portion increases while that on the other side decreases.

2. A transducer assembly according to claim 1 in which the capacitors formed by the two sets of plates are connected in a balanced electrical circuit producing a differential output.

3. A transducer assembly according to claim 1 or claim 2 in which the plates of the capacitors are of annular form, enclosing the first load-transmitting member.

4. A transducer assembly according to claim 3 in which the resilient load-transmitting means comprising circumferentially spaced spring assemblies spaced further from the axis than the capacitor plates.

5. A transducer assembly according to claim 4 in which there are four of the said spring assemblies spaced at the corners of a rectangle.

6. A transducer assembly according to claim 5 in which the spring assemblies are made up of disc springs.

7. A transducer assembly according to claim 6 in which the disc springs are mounted on bolts which extend between the flanges and through the said portion of the second member.

8. A transducer assembly according to claim 1 or 2 in which the capacitor plates are separated by sheets of dielectric material of undulating or corrugated form, such as to urge the plates lightly apart.

9. A transducer assembly according to claim 1 or 2 in which the capacitor plates are of undulating or corrugated form, such as to urge them apart from dielectric sheets plates present between them.

10. A drawbar assembly for a road vehicle incorporating a transducer assembly according to claim 1 or 2.

11. A transducers assembly according to claim 3 in which the capacitor plates are separated by sheets of dielectric material of undulating or corrugated form, such as to urge the plates lightly apart.

12. A transducer assembly according to claim 4 in which the capacitor plates are separated by sheets of dielectric material of undulating or corrugated form, such as to urge the plates lightly apart.

13. A transducer assembly according to claim 5 in which the capacitor plates are separated by sheets of dielectric material of undulating or corrugated form, such as to urge the plates lightly apart.

14. A transducer assembly according to claim 6 in which the capacitor plates are separated by sheets of dielectric material of undulating or corrugated form, such as to urge the plates lightly apart.

15. A transducer assembly according to claim 7 in which the capacitor plates are separated by sheets of dielectric material of undulating or corrugated form, such as to urge the plates lightly apart.

16. A transducer assembly according to claim 3 in which the capacitor plates are of undulating or corrugated form, such as to urge them apart from dielectric sheets plates present between them.

17. A transducer assembly according to claim 4 in which the capacitor plates are of undulating or corrugated form, such as to urge them apart from dielectric sheets plates present between them.

18. A transducer assembly according to claim 5 in which the capacitor plates are of undulating or corrugated form, such as to urge them apart from dielectric sheets plates present between them.

19. A transducer assembly according to claim 6 in which the capacitor plates are of undulating or corrugated form, such as to urge them apart from dielectric sheets plates present between them.

20. A transducer assembly according to claim 7 in which the capacitor plates are of undulating or corrugated form, such as to urge them apart from dielectric sheets plates present between them.

21. A transducer assembly according to claim 8 in which the capacitor plates are of undulating or corrugated form, such as to urge them apart from dielectric sheets plates present between them.

* * * * *

UNITED STATES PATENT AND TRADEMARK OFFICE
CERTIFICATE OF CORRECTION

PATENT NO. : 5,289,435

DATED : 22 February 1994

INVENTOR(S) : Peter J. Milner and Andrew R. Fry

It is certified that error appears in the above-identified patent and that said Letters Patent is hereby corrected as shown below:

Title page, item [54] and in column 1, line 2, change "CAPACTIVE" to --CAPACITIVE--.

Title page, after item [22] insert the following:

[86] PCT No.: PCT/GB91/00141

§371 Date: Jul. 27, 1992

§102(e) Date: Jul. 27, 1992

[87] PCT Pub. No.: WO 91/11351

PCT Pub. Date: August 8, 1991

Signed and Sealed this

Third Day of January, 1995

Attest:

BRUCE LEHMAN

Attesting Officer     *Commissioner of Patents and Trademarks*